(12) United States Patent
Godwin

(10) Patent No.: US 7,860,118 B2
(45) Date of Patent: Dec. 28, 2010

(54) ADAPTATION OF DIAL-UP DEVICES TO BROADBAND FACILITIES

(75) Inventor: John P. Godwin, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 94 days.

(21) Appl. No.: 12/410,352

(22) Filed: Mar. 24, 2009

(65) Prior Publication Data

US 2009/0180487 A1 Jul. 16, 2009

Related U.S. Application Data

(63) Continuation of application No. 10/386,772, filed on Mar. 12, 2003, now Pat. No. 7,525,976.

(51) Int. Cl.
*H04L 12/28* (2006.01)
*H04J 1/00* (2006.01)

(52) U.S. Cl. ........................ 370/402; 370/485

(58) Field of Classification Search ................ 370/402, 370/485–490
See application file for complete search history.

(56) References Cited

U.S. PATENT DOCUMENTS

| | | | |
|---|---|---|---|
| 4,750,199 A | 6/1988 | Norwich | |
| 6,052,573 A * | 4/2000 | Ohmori et al. | ............... 455/401 |
| 6,101,216 A | 8/2000 | Henderson et al. | |
| 6,141,682 A | 10/2000 | Barker | |
| 6,144,724 A | 11/2000 | Stovall | |
| 6,144,998 A | 11/2000 | Pisterzi | |
| 6,263,016 B1 | 7/2001 | Bellenger et al. | |
| 6,272,108 B1 * | 8/2001 | Chapman | ............... 370/226 |
| 6,288,738 B1 | 9/2001 | Dureau et al. | |
| 6,636,482 B2 * | 10/2003 | Cloonan et al. | ............ 370/230 |
| 6,847,635 B1 * | 1/2005 | Beser | .................... 370/352 |
| 6,914,893 B2 * | 7/2005 | Petite | ..................... 370/338 |
| 2001/0030959 A1 * | 10/2001 | Ozawa et al. | ............... 370/386 |
| 2001/0036192 A1 * | 11/2001 | Chiles et al. | ................ 370/401 |

(Continued)

FOREIGN PATENT DOCUMENTS

WO    WO 00/11843    3/2000

(Continued)

OTHER PUBLICATIONS

EPO Communication dated Jun. 11, 2007 in European counterpart Application No. 04251439.8.

(Continued)

*Primary Examiner*—Hong Cho

(57) ABSTRACT

A method and system for dial-up device (36) connection to a broadband facility (28) by way of a home gateway (10). The microcomputer (20) causes the dial-up modem (24) in the home gateway to serve as a host modem. The microcomputer (20) also implements the host portion of a log-in protocol that is expected by the dial up device, in this example the IRD's (34). Within the IRD (34) itself, a software download causes the dial-up modem in the IRD (34) to not go "off-hook" when starting a callback. The local office, i.e. the PSTN, will not recognize the start of a dial-up session and will not issue a dial tone. The home gateway 10 and the IRD's (34) will carry out a protocol that does not require the recognition of "off-hook".

20 Claims, 3 Drawing Sheets

U.S. PATENT DOCUMENTS

| | | |
|---|---|---|
| 2002/0012347 A1 | 1/2002 | Fitzpatrick |
| 2005/0152404 A1* | 7/2005 | Holmquist et al. .......... 370/485 |
| 2005/0174938 A1* | 8/2005 | Richardson et al. ...... 370/230.1 |

FOREIGN PATENT DOCUMENTS

| | | |
|---|---|---|
| WO | WO 02/058351 | 7/2002 |

OTHER PUBLICATIONS

EPO Communication dated Oct. 26, 2007 in European counterpart Application No. 04251439.8.

Somekh, Oren; "Modem Over Packet Networks Technology"; Electronic Product Design; IML Publication, GB; vol. 22, No. 11; Nov. 2001; pp. 45, 56, 58; XP009015577.

EPO Communication dated Aug. 18, 2009 in European patent application No. 04251439.8 filed Mar. 12, 2004 by John P. Godwin; 3 pages.

* cited by examiner

ADAPTATION OF DIAL-UP DEVICES TO BROADBAND FACILITIES

TECHNICAL FIELD

The present invention relates generally to a system and method for interfacing dial-up devices with broadband facilities and more particularly to interfacing a plurality of dial-up devices without interruption of other devices within the same location.

BACKGROUND OF THE INVENTION

Homes and businesses are populated with millions of devices with voice-band, dial-up modems designed to transfer information over the telephone circuits of the Public Switched Telephone Network (PSTN). In addition to these dial-up devices, homes and businesses are utilizing broadband facilities such as Digital Subscriber Line (DSL), cable modems, and broadband wireless. The dial-up devices are "narrowband" and may not be capable of utilizing the increased bandwidth of the broadband communications facilities. However there is a need to interface dial-up devices to broadband facilities to alleviate the need for multiple phone lines within a single location.

For example, a home may have one or more personal computers with modems, fax machines, alarm systems, home entertainment Integrated Receiver/Decoders (IRD) and many more devices. These devices currently require a multi-second dial-up sequence before starting a data transfer. There is a need for these devices to have access to "always-on" efficient, high quality transport.

SUMMARY OF THE INVENTION

The present invention is a system and method for interfacing dial-up devices to broadband facilities, thereby eliminating the need for additional line connections. According to the present invention a system and method is provided that allows a plurality of devices, such as but not limited to, personal computers with modems, fax machines, household alarms systems, home entertainment IRD's and more to access their hosts including the capability to accept incoming calls without disruption of other devices.

According to the present invention, a home gateway is provided having access to broadband facilities. A typical home gateway has an "emergency" dial-up modem that is available in the event the DSL is not available. A personal computer connected to the gateway uses the "emergency" modem available in the gateway to access the Internet by way of a Home Phoneline Network Alliance (HPNA) protocol or similar method.

"On hook" is an expression describing a telephone line connection that is not in use and "off hook" is an expression describing a telephone line connection that is in use. The dial-up device has software that allows it to have continuous connection with an "always-on" status via the gateway. A host can then individually access the dial-up device by way of the gateway and Internet. The modem software does not allow the device to go "off-hook" when starting a callback. This means that the local telephone office will not recognize the start of a dial-up session and will not issue a dial-tone. The gateway and the dial-up device carry out a protocol that does not require recognition of off-hook.

It is an object of the present invention to provide dial-up devices with the same "always-on" efficient, high quality transport associated with DSL services. It is another object of the present invention to interface dial-up devices within a location with broadband facilities without disruption of other devices within the same location.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Figure 1:
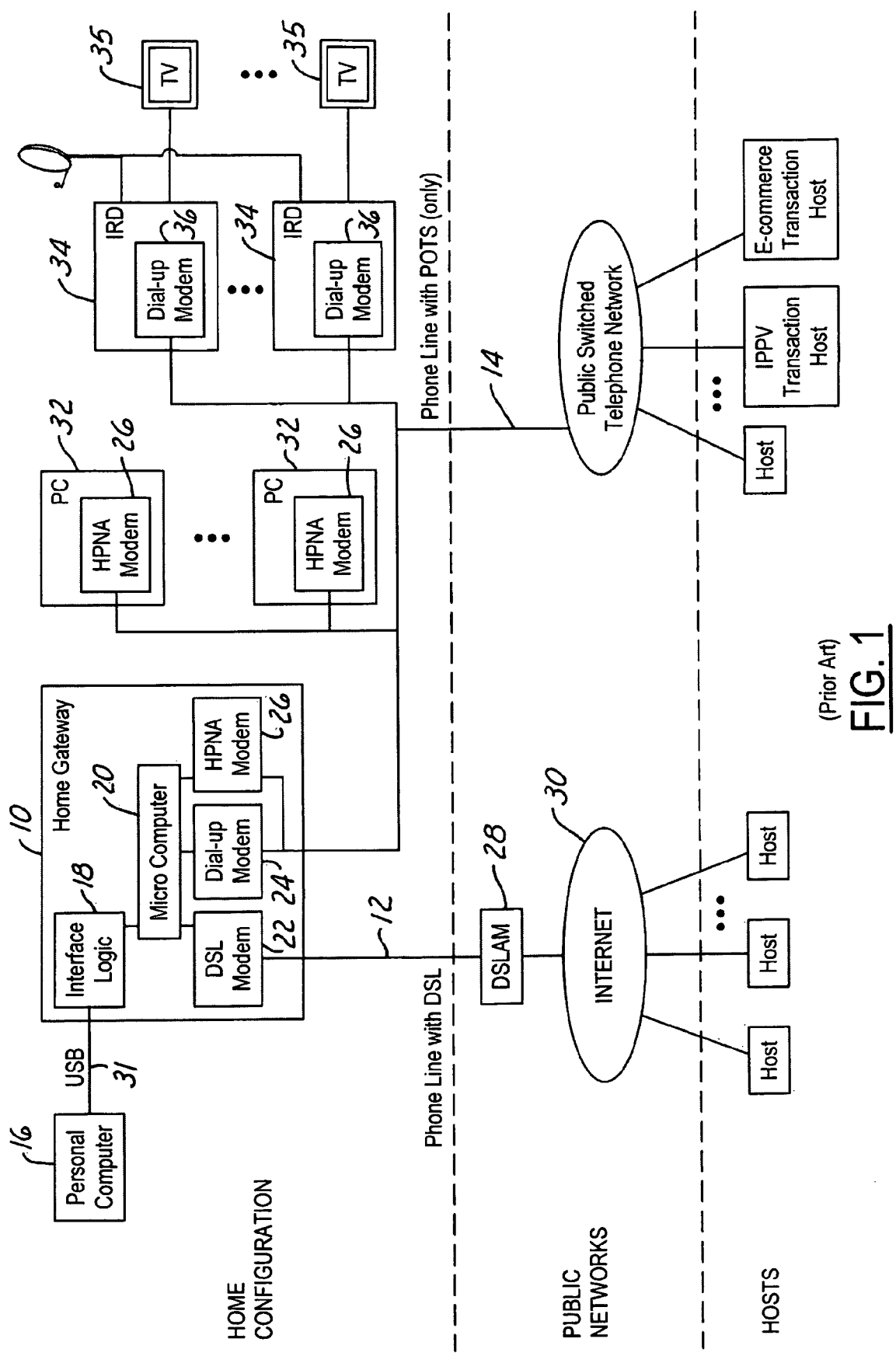
FIG. 1 is a prior art installation of a DSL gateway and IRD in an example home.

FIG. 1 is a block diagram of a prior art installation of a home gateway 10 having both a DSL phone line 12 and a Plain Old Telephone Service (POTS) line 14. The present invention will be described herein with an application having an IRD and DSL. However it should be noted that the present invention is applicable to a variety of applications. The home DSL gateway 10 has connection to a personal computer 16. The gateway 10 has interface logic 18 that interfaces the personal computer 16 with a microcomputer 20 in the gateway. The microcomputer 20 may have several modem devices connected thereto. For example, a DSL modem 22, a dial-up modem 24 and a HPNA modem 26 are all typically in communication with the microcomputer 20 in the gateway 10.

The gateway 10 provides the DSL modem 22 interface at Mega bit per second data speeds to a Digital Subscriber Line Multiple Access Multiplexer (DSLAM) 28 that is housed at a local telephone office. The DSLAM 28 and a local digital network interlink to the Internet 30.

Within the configuration at a home location, the personal computer 16 connects to the gateway by way of an interface such as a Universal Serial Bus (USB) 31. Other personal computers 32 may connect to the gateway 10 and the Internet 30 using a dedicated HPNA modem 26. The dial-up modem 24 is typically included in the gateway 10 as a backup to the DSL facility.

Also at the home location, there are one or more Integrated Receiver Decoders (IRD) 34 that receive satellite transmissions for one or more televisions 35. The Integrated Receiver Decoders 34, such as the type used with DIRECTV, contain a dial-up modem 36, and all the IRD's 34 are connected to a common phone line 14 within the home. The modem in a typical IRD is used very infrequently, roughly on the order of once per month, for reporting pay-per-view purchases. Some IRD's are equipped with e-commerce features and the modem 36 is also used for electronic commerce applications.

According to the present invention, a software download can be made to the modem 36 at the IRD's so that a service provider, such as DIRECTV, can access the IRD's 34 individually by way of the Internet and the home gateway, at dial-up speeds, without the need for a separate phone line to make a connection to a host.

Figure 2:
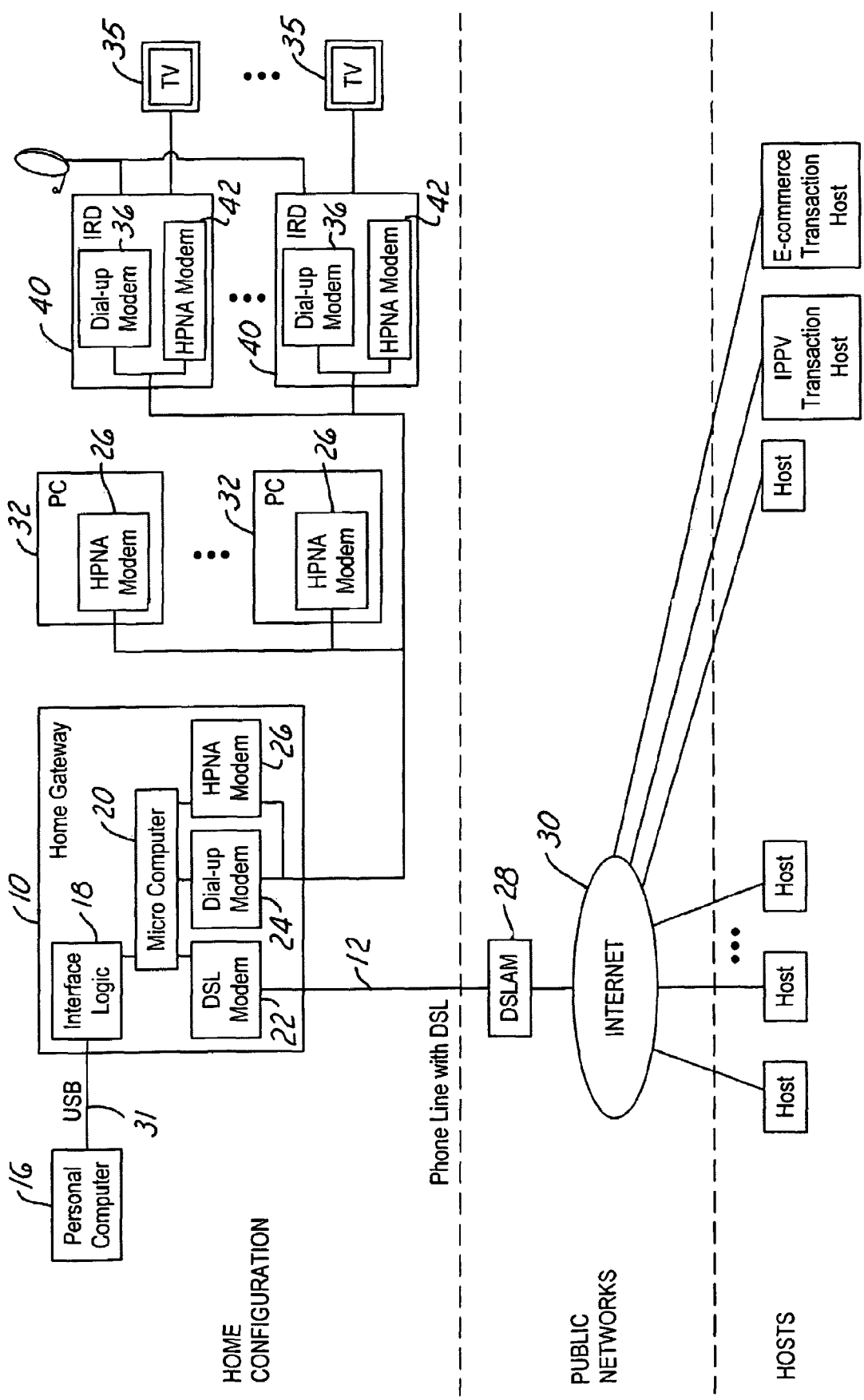
FIG. 2 is a proposed installation of a DSL gateway and IRD having an HPNA modem.

FIG. 2 is an illustration of an application having an advanced IRD 40. Like elements in FIG. 2 have the same reference numbers as the elements described with reference to FIG. 1. However, the advanced version of the IRD 40 shown in FIG. 2 does not require a common phone line. The IRD 40 has an additional modem compliant with the Home Phone Network Alliance (HPNA), or similar protocol. An HPNA modem 42 is built-in to the IRD 40 to provide Internet access to the IRD through the home gateway 10. This is an alternative design to the IRD shown in FIG. 1. It should be noted that the HPNA modem 42 is not necessary for the IRD 40 to have access to the Internet by way of the home gateway.

Figure 3:
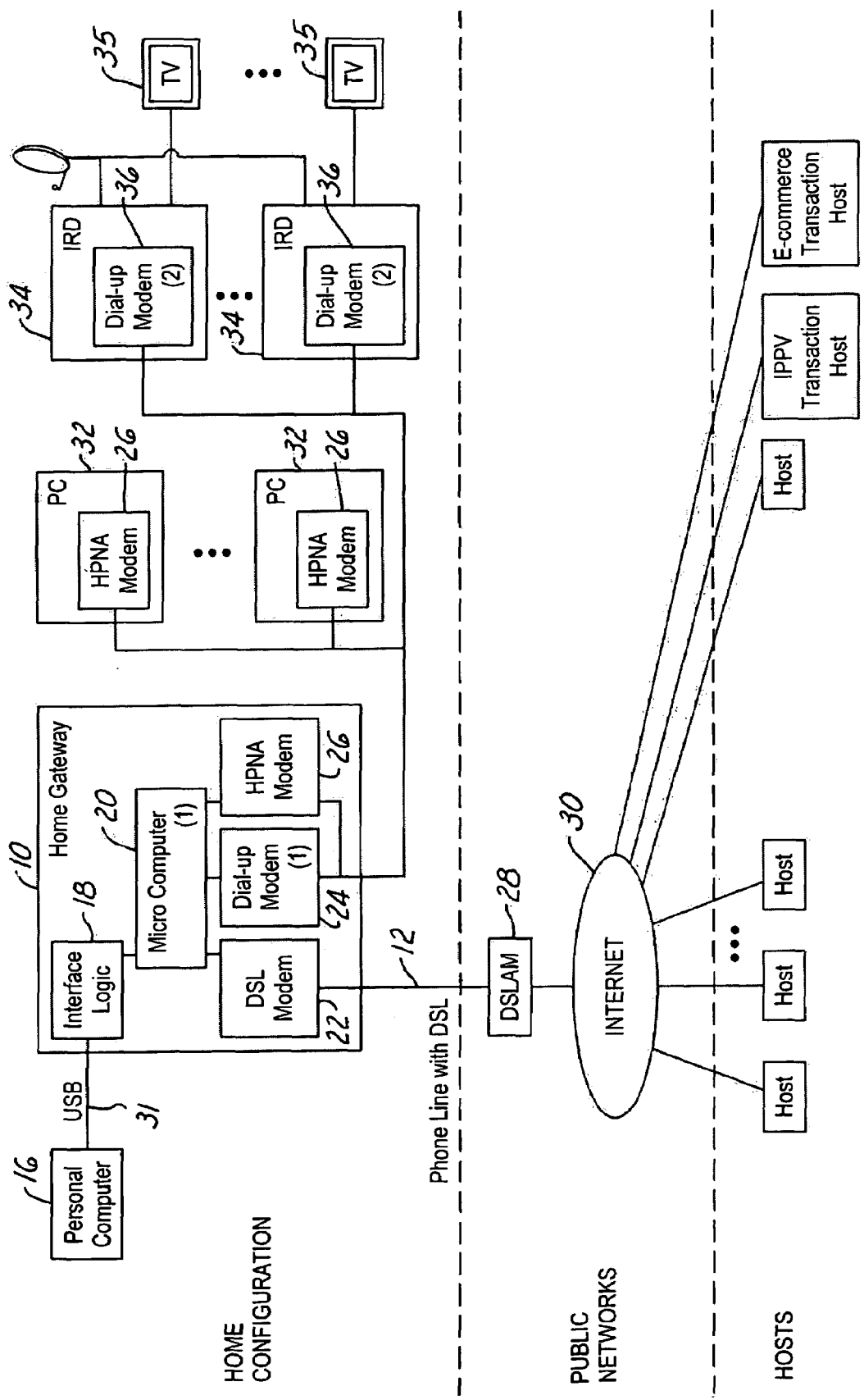
FIG. 3 is a diagram of the gateway installation of the present invention.

The present invention is further embodied in FIG. 3, which eliminates the need for an additional phone line to the PSTN to connect a typical dial-up modem in the IRD, or other device, with a host. The present invention is described herein with reference to an IRD, but it should be noted that any dial-up modem device may be substituted for the IRD described herein without departing from the scope of the present invention. The hardware within the IRD and within the gateway is not affected at all by the present invention. The software within the IRD and the home gateway are the only modifications necessary to provide the always-on access for the dial-up device.

Regarding FIGS. 1 and 3, like elements reflect like reference numbers. Referring particularly to FIG. 3, the microcomputer 20 causes the dial-up modem 24 in the home gateway to serve as a host modem. The microcomputer 20 also implements the host portion of a log-in protocol that is expected by the dial up device, in this example the IRD's 34. Within the IRD 34 itself, a software download causes the dial-up modem in the IRD 34 to not go "off-hook" when starting a callback. The local office, i.e. the PSTN, will not recognize the start of a dial-up session and will not issue a dial tone. The home gateway 10 and the IRD's 34 will carry out a protocol that does not require the recognition of "off-hook". According to the present invention, the modem in the IRD is used to connect to the DSL modem in the gateway and a connection is made to the service provider by way of the internet.

The present invention is applicable to the situation where a location has a phone line dedicated to DSL as easily as it is applied to the situation where a location has line-sharing between DSL and POTS. In a typical location, such as a household, the telephone wiring has a total of six conductors that constitute three pairs of conductors in a RJ-11 outlet. Only one pair of conductors is needed for each phone line. For purposes of the disclosure herein line one will refer to one pair, line 2 will refer to the next pair, and line 3 will refer to the third pair. Typically, dial-up devices such as an IRD or a fax machine, have a RJ-11 plug that is wired to use line 1 in the RJ-11 outlet.

For a household that has phone line dedicated to DSL, the DSL is, by example, hooked up to the line 2 wiring. The present invention provides access to the dial-up port on the home gateway, and in order to have the local office ignore the IRD's "off-hook" status during dial-up, an adapter plug is used between the IRD plug and a wall outlet, which connects the IRD to the DSL line, line 2, within the home. A similar adapter is used at the home gateway 10.

For a household that has line-shared DSL using line 1, then an adapter is used to move the IRD's dial-up to line 2. In the event that line 2 is used for POTS, another adapter is used to move the IRD tones to line 3.

In the event the IRD dial-up modem tones cannot be moved to a dedicated wire pair, the IRD protocol is modified through software to eliminate the off-hook signal. The local office will then ignore the interchange between the IRD and the home gateway.

For households that have more than one IRD on the same wire pair or in situations where it is desirable for sessions to be initiated from the home gateway, the "Off-hook/On-hook" status is ignored by the IRD and the gateway. Whenever powered "ON", the gateway periodically sends a polling message to any connected IRD's. The IRD's respond in a time sequence based on offsets given by the software download to the IRD. When the IRD's are powered "ON", they wait for a poll from the gateway.

In another embodiment of the present invention, a smart card is used. Current technology employs a smart card integral to the IRD. The smart card contains an embedded microprocessor and provides over-the-air programmability features in conjunction with the present invention. For example, the destination phone number may be changed by download to the smart card by way of the internet.

According to a primary application of the present invention, the IRD must be programmable to a certain degree. Where no re-programmability exists, a dedicated wire pair for the IRD is necessary. An IRD with limited re-programmability may use a software patch to eliminate the "off-hook" portion of the dial-up sequence. A single IRD can talk to the home gateway and not solicit a dial tone from the local office. With multiple IRD's in one home, they have the capability of transmitting simultaneously, but their protocols will "retry" later. The IRD that has limited re-programmability should continue to check for the "off-hook" state before a communications session so that they don't interfere with standard telephone calls by the customer.

In IRD's having a high degree of re-programmability, all IRD's within a home location can be configured to the polling protocol described herein. The IRD's will have virtually "always-on" communication and messages can be delivered to any IRD.

The invention covers all alternatives, modifications, and equivalents, as may be included within the spirit and scope of the appended claims.

What is claimed is:

1. A method of connecting a remote device to a broadband facility, comprising:
   connecting a remote device to a gateway device, the gateway device comprising a microcomputer, a modem, and a dial-up device;
   establishing an adaptive communications path between the remote device and the broadband facility via the modem of the gateway device and via a local telephone office;
   implementing, via the dial-up device, a log-in protocol for a remote host that communicates with the broadband facility; and
   initiating a callback procedure from the remote host to provide access from the remote host to the remote device via the gateway device, wherein a dial tone response to an off-hook signal received at the local telephone office from the remote device is inactivated during the callback procedure.

2. The method of claim 1, wherein the remote device is an Integrated Receiver/Decoder (IRD).

3. The method of claim 1, further comprising moving modem dial-up signals for the remote device from the adaptive communications path to a line connection.

4. The method of claim 1, further comprising:
   polling the remote device from the gateway device; and
   responding to the polling using a time-sequence stored in the remote device.

5. The method of claim 4, wherein the polling is performed on a periodic basis.

6. The method of claim 4, wherein the time-sequence is based on software settings in the remote device.

7. The method of claim 1, further comprising modifying a protocol for the remote device via a software download to the remote device.

8. The method of clam 1, further comprising accessing the remote device via an internet connection with the gateway device.

9. A gateway device for connecting a remote device to a broadband facility, comprising:
  a microcomputer;
  a modem, coupled to the microcomputer; and
  a reconfigurable dial-up device, coupled to the microcomputer, the dial-up device implementing a log-in protocol for a remote host that is in communication with the broadband facility via a communications path;
  wherein the reconfigurable dial-up device adaptively couples a remote device to the gateway device via a local telephone office, such that a dial tone response to an off-hook signal received at the local telephone office from the remote device is inactivated during a callback procedure initiated by the remote host.

10. The gateway device of claim 9, wherein the reconfigurable dial-up device is reconfigurable from a location remote from the reconfigurable dial-up device.

11. The gateway device of claim 9, wherein the remote device is an Integrated Receiver/Decoder (IRD).

12. The gateway device of claim 9, further comprising a line connection, coupled to the remote device, for carrying modem dial-up signals from the remote device to the reconfigurable dial-up device.

13. The gateway device of claim 12, wherein the modem dial-up signals are moved from the communications path to the line connection.

14. The gateway device of claim 9, wherein the remote device is polled by the gateway device, and the remote device responds to the polling in a time-sequence stored in the remote device.

15. The gateway device of claim 9, further comprising modifying a protocol for the remote device via a software download to the remote device.

16. A system for connecting at least one integrated receiver/decoder to a broadband facility, comprising:
  an integrated receiver/decoder having a first dial-up modem;
  a gateway, the gateway comprising a microcomputer, a second dial-up modem, and a digital subscriber line modem, the gateway being coupled to the broadband facility, wherein the second dial-up modem implements a log-in protocol for a remote host that communicates with the broadband facility;
  a communication connection between the first dial-up modem and the second dial-up modem, wherein when the remote host initiates a callback procedure to the first dial-up modem via the gateway a dial tone response to an off-hook signal received at the local telephone office from the integrated receiver/decoder is inactivated during the callback procedure.

17. The system of claim 16, further comprising a dedicated digital subscriber line, wherein the first dial-up modem is connected to the dedicated digital subscriber line to provide an always-on connection between the broadband facility and the integrated receiver/decoder.

18. The system of claim 16, further comprising:
  a shared digital subscriber line, wherein the first dial-up modem is connected to the shared digital subscriber line; and
  a polling protocol between the gateway and the integrated receiver/decoder implemented via the shared digital subscriber line.

19. The system of claim 16, further comprising a line connection, coupled to the integrated receiver/decoder, for carrying modem dial-up signals from the integrated receiver/decoder to the second dial-up modem.

20. The system of claim 19, wherein the modem dial-up signals are moved from the communication connection to the line connection.

* * * * *